United States Patent
Retnakumari et al.

(10) Patent No.: US 10,476,936 B1
(45) Date of Patent: Nov. 12, 2019

(54) PLUGIN-BASED FILE TRANSFER SYSTEMS AND/OR METHODS

(71) Applicant: Software AG, Darmstadt (DE)

(72) Inventors: Sanju Krishnan Retnakumari, Bangalore (IN); Bhaskar Bhattarai, Bangalore (IN)

(73) Assignee: SOFTWARE AG, Darmstadt (DE)

( * ) Notice: Subject to any disclaimer, the term of this patent is extended or adjusted under 35 U.S.C. 154(b) by 0 days.

(21) Appl. No.: 16/219,288

(22) Filed: Dec. 13, 2018

(51) Int. Cl.
| | |
|---|---|
| H04L 29/08 | (2006.01) |
| H04L 29/06 | (2006.01) |
| G06F 9/54 | (2006.01) |
| G06F 16/185 | (2019.01) |
| G06F 9/445 | (2018.01) |

(52) U.S. Cl.
CPC .......... *H04L 67/06* (2013.01); *G06F 9/44526* (2013.01); *G06F 9/541* (2013.01); *G06F 16/185* (2019.01); *H04L 67/42* (2013.01)

(58) Field of Classification Search
CPC ......... H04L 67/06; H04L 67/42; G06F 9/541; G06F 9/44526; G06F 16/185
See application file for complete search history.

(56) References Cited

U.S. PATENT DOCUMENTS

| | | | |
|---|---|---|---|
| 7,903,549 B2 | 3/2011 | Judge et al. | |
| 8,578,127 B2 * | 11/2013 | Thatcher | G06F 3/0604 711/103 |
| 9,128,941 B2 | 9/2015 | Shulman et al. | |
| 2004/0204071 A1 * | 10/2004 | Bahl | H04W 28/18 455/557 |
| 2007/0028110 A1 | 2/2007 | Brennan | |
| 2013/0332524 A1 * | 12/2013 | Fiala | H04W 4/50 709/204 |
| 2017/0359403 A1 | 12/2017 | Brinkman et al. | |
| 2018/0034892 A1 * | 2/2018 | Olsen | H04L 67/06 |

OTHER PUBLICATIONS

Ross, B., Engin Zhang, B., Kosar, T. "Managed File Transfer as a Cloud Service". Cloud Computing for Data-intensive Applications; 2014, p. 379-399. (Year: 2014).*

(Continued)

*Primary Examiner* — John M Macilwinen
(74) *Attorney, Agent, or Firm* — Nixon & Vanderhye P.C.

(57) ABSTRACT

Certain example embodiments relate to data transfer techniques. A server receives from a client, using a standard communication protocol, a file operation command that relates to a data transfer and indicates data to be transferred and/or a preference for how to transfer data. If the server and client do not have implemented thereon complementary plugins configured to facilitate the data transfer in accordance with the file operation command, the data transfer takes place between the server and client using the standard communication protocol. If the server and client have implemented thereon complementary plugins configured to facilitate the data transfer in accordance with the file operation command, the data transfer takes place using (a) a common communication protocol that is implemented by the complementary plugins but different from the standard communication protocol, and/or (b) data selected and/or transformed by the server-side plugin and understandable by the client-side plugin.

30 Claims, 11 Drawing Sheets

(56) References Cited

OTHER PUBLICATIONS

Hethmon, P. and Elz, R. RFC 2389. "Feature negotiation mechanism for the File Transfer Protocol". 1998. p. 1-9. (Year: 1998).*
Postel, J. and Reynolds, J. RFC 959. "File Transfer Protocol (FTP)". 1985. p. 1-69. (Year: 1985).*
Allcock, W. "GridFTP: Protocol Extensions to FTP for the Grid". Argonne National Laboratory. 2003. p. 1-28. (Year: 2003).*
Mehdi Chehel Amirani et al., "A New Approach to Content-based File Type Detection", Proceedings of the 13th IEEE Symposium on Computers and Communications (ISCC), pp. 1103-1108, Jul. 2008.

* cited by examiner

```
<PurchaseOrder PurchaseOrderNumber="99503" OrderDate="1999-10-20">
  <Address Type="Shipping">
    <Name>Ellen Adams</Name>
    <Street>123 Maple Street</Street>
    <City>Mill Valley</City>
    <State>CA</State>
    <Zip>10999</Zip>
    <Country>USA</Country>
  </Address>
  <Address Type="Billing">
    <Name>Tai Yee</Name>
    <Street>8 Oak Avenue</Street>
    <City>Old Town</City>
    <State>PA</State>
    <Zip>95819</Zip>
    <Country>USA</Country>
  </Address>
  <DeliveryNotes>Please leave packages in shed by driveway.</DeliveryNotes>
  <Items>
    <Item PartNumber="872-AA">
      <ProductName>Lawnmower</ProductName>
      <Quantity>1</Quantity>
      <USPrice>148.95</USPrice>
      <Comment>Confirm this is electric</Comment>
    </Item>
    <Item PartNumber="926-AA">
      <ProductName>Baby Monitor</ProductName>
      <Quantity>2</Quantity>
      <USPrice>39.98</USPrice>
      <ShipDate>1999-05-21</ShipDate>
    </Item>
  </Items>
</PurchaseOrder>
<?xml version="1.0"?>
```

Fig. 7

PLUGIN-BASED FILE TRANSFER SYSTEMS AND/OR METHODS

TECHNICAL FIELD

Certain example embodiments described herein relate to file transfer techniques. More particularly, certain example embodiments described herein relate to systems and/or methods that implement server-side and client-side plugins to enable enhanced data transfer techniques to take place using a standard communication protocol such as the file transfer protocol (FTP).

BACKGROUND AND SUMMARY

In today's connected world, data is shared between parties all the time. Computers download programs and program updates, organizations share data to cooperate when fulfilling business or other objectives such as those that might be involved in a physical manufacturing process or order request, computer control systems download control instructions and upload reports, audio is exchanged during Voice over IP (VoIP) telephone calls, friends exchange pictures and video over social media, etc. Data transfer, also sometimes called file transfer (even though data other than "files" per se might be the subject of those transfers), thus oftentimes is an integral part of a computer systems, it ensures that information is properly exchanged. File transfer can be especially important for Business-to-Business (B2B) software systems. B2B software systems refer to software systems in enterprises or organizations that talk to each other for information exchange, e.g., when fulfilling orders, sending invoice details, providing product information, etc.

During the early days of software development, file transfer protocols like FTP, SFTP, etc., were used to transfer files between different systems. As is known, the File Transfer Protocol (FTP) is a standard network protocol used for the transfer of computer files between two systems or computers in a network, and SFTP (SSH File Transfer Protocol or Secure File Transfer Protocol) is a network protocol that provides file access, file transfer, and file management over any reliable data stream in a secure manner. SSH or Secure Shell is a cryptographic network protocol for operating network services securely over an unsecured network. By default, SFTP uses the SSH protocol to authenticate and establish a secure connection. SCP or Secure Copy Protocol also is based on the SSH protocol and provides a means of securely transferring computer files between a local host and a remote host, or between two remote hosts, and SCP still is in use today.

Other technologies also evolved, sometimes in parallel with these basic file transfer protocols. For instance, Electronic Document Interchange (EDI) evolved, making possible the interchange of B2B data in a more structured manner. In modern software systems, numerous technologies are available for facilitating the exchange of data. Web Services, for example, enable information to be exchanged in a more controlled manner.

An increasing number of vendors are offering Managed File Transfer (MFT) products. In general, a MFT product is a software product or solution that manages the (typically secure) transfer of data from one computer to another through a network. MFT products offer additional capabilities on top of file transfers such as, for example, automated data transfers based on specific policies, management of file transfer configurations, monitoring and controlling of the file transfers, error handling, etc. One example MFT product is webMethods ActiveTransfer, which is commercially available from the assignee. MFT products are expected to grow from a valuation of $975.8 million in 2017 to $1,637.3 million by 2024, because of concerns related to reliability, security, support of legacy systems, and/or the like.

Although modern and sophisticated technologies are available for B2B data interchange and other information exchange, MFT products are gaining in popularity and traditional file transfer protocols like FTP, SFTP, etc., are still predominately used in B2B systems and applications for file transfers between enterprises. Yet when it comes to transferring data between systems in a network, traditional file transfer protocols have many disadvantages compared to modern technologies. For example, traditional protocols are technical in nature and deal mostly with the transfer of data between systems in a network. They oftentimes are not "business aware," whereas more modern technologies sometimes are business- or service-oriented. Also, some modern technologies can integrate with or "talk to" each other, whereas traditional file transfer systems generally cannot operate, or co-operate, in such manners. Many file transfers involve large file transfers including, for example, transfers in the range of a few gigabytes (GB) of data. Large file transfers using traditional transfer protocols are still a challenge to many enterprises and systems because of issues such as, for example, with long transfer times, low bandwidth, data corruption, handling transient failures and resuming the transfer on failure, etc.

Each traditional protocol uses its own different method or technology for authentication, handshake, file transfer, etc., e.g., as documented as part of the corresponding specification. The commands that are exchanged for each protocol generally are different. Also, there are variations for each protocol, as well as newer versions that provide newer capabilities. FIG. 1 is an example signal diagram showing a typical data (file) transfer occurring using a traditional file transfer protocol. As shown in FIG. 1, a client request a connection with a file transfer server, and a connection is established. The client sends authentication data, and the file transfer server indicates whether the authentication is successful. If it is, then the client sends commands to the file transfer server. For instance, the client may request a list of the files, directories, and/or other objects on the file transfer server. The file transfer server responds to those commands. A client might request a file download, triggering the file transfer server to then transfer the file data. Ultimately, the client may request that the connection is closed, and that connection may be closed accordingly.

Each protocol might have additional steps or a custom way to accomplish at least some of the above aspects. For example, FTP will require one socket (or connection) for exchanging commands, and another for transferring data. Also, as alluded to above, the authentication mechanisms, security support, channel for communication, etc., typically will be different for each protocol. It also will be appreciated that the data exchange here is protocol specific, and that this is independent of what data is being exchanged. Irrespective of whether the information exchanged is that of sales information or trading information, big files or small files, partial information or complete information, etc., ultimately, data is converted to files, and the client requests (or downloads) files or uploads files.

More modern day communication architectures are more data-oriented, business-aware, and/or service-oriented technologies. They oftentimes are application programming interface (API) based. REST (Representational State Transfer), for example, is an architectural style that defines a set of constraints to be used for creating web services. Web Services that conform to the REST architectural style, or RESTful web services, provide interoperability between computer systems on the Internet. REST-compliant web services allow the requesting systems to access and manipulate textual representations of web resources by using a uniform and predefined set of stateless operations. In general, a client may request the exact information that it requires, and the server understands the request (what information client is looking for) and sends back the required information. Because the request for data and the response typically happens as and when required, the amount of data that is part of a single data transfer is typically small.

FIG. 2 is an example of a data exchange using a more modern technology such as REST. As shown in FIG. 2, the client requests the data associated with specific sale information, and the server returns the data for the requested information. Here, the request is formulated according to the business need (or data requirement), and the response has only the information requested by the client. Thus, it will be appreciated that this more modern data exchange is more data or business dependent, as opposed to be more protocol dependent.

As noted above, although these more modern technologies and architectures for data exchange oftentimes are easy to use and superior in some of the respects mentioned above, traditional file transfer protocols are still widely used. There are a variety of reasons for this. For example, traditional file transfer protocols are time-tested and proven solutions that in many instances have been running for organizations for many years. They are seen as being reliable and resilient, and organizations oftentimes are resistant to risk this for a newer technology. As another example, there are many legacy systems, mainframes, etc., that are built or otherwise designed to handle data exchanges via more traditional file transfer technologies. As long as these legacy systems are part of the customer IT solution, support for traditional file transfer protocols generally is required for facilitating data exchanges, integration between different systems, etc. As still another example, there are still many use cases or parts of a solution that works on files and thus are not always well suited for modern systems. For instance, scanned images as PDF files, invoices that need to be sent to customers, etc., generally are file-based and file transfer protocols typically will be used accordingly. More modern MFT products (such as, for example, the webMethods ActiveTransfer) provide a lot of management and monitoring capabilities for traditional file transfer protocols, and these technologies sometimes actually enable enterprises to manage, control, and schedule file transfer operations, making further evolution less likely.

As mentioned above, traditional file transfer protocols work on the data or transport level and are not business-aware. Thus, the client generally requests a file rather than business-relevant information, and the server has to make available a set of files that the client can request. A new type of data request from a client will require the server to add the logic to create the new set of files. This is not an easy process, insofar as it oftentimes requires a job running at required intervals to create the required files, and then clean up the files when used, etc. By contrast, in more modern data exchange technologies, it generally is much easier to add a new API or API function, as the API implementation just needs to fetch the data from the backend without necessarily being concerned about file maintenance and other lifecycle activities. Traditional file transfer protocols thus are not as agile as more modern technologies.

In traditional file transfer protocols, even if the client requires only a small part of the data in a file, the client oftentimes will end up downloading the entire file. This behavior generally follows because of the protocols work on the file and the transport level, rather than on the content. This can be especially problematic for large files. For example, files that contains daily sales information in a store, trading information related to a stock exchange, data drawn from a host of Internet-of-Things (IoT) sensors, and/or other Big Data sources generate large amounts of data, but only a comparatively small part of that data may need to be accessed at a given time by a given client. A trading client, for example, might actually want only the trading information for a stock at a particular time, but might be forced to download the entire trading information for the corresponding day because of the way that the protocols are designed and implemented. In more modern API-based technologies, clients can pass the required parameters (e.g., trading time windows, stock price, etc.) so that the server simply sends back to the client only the data that is required and relevant.

More modern day information exchange technologies are designed so that they can interoperate and/or integrate with one another. More current technologies tend to be API-based, and the implementation can be further subdivided into smaller services. For example, the microservices architecture, in which an application is built as a collection of loosely-coupled services that implement business capabilities, is used widely these days. Advantageously, microservices architecture enables service, for instance, to use a different technology to get the required data. Most of the traditional file transfer approaches were created at a time when there is no concept or requirement for microservices architecture. Traditional file transfer protocols are designed as monolithic systems, and such products do not integrate and/or interoperate with other information exchange systems or APIs directly.

Many modern information exchange technologies support API management, which can be used to create and publish the APIs, enforce their usage policies, control access, etc. But because of the way traditional file transfer protocols are defined, and because such products focus on transport technology rather than the data itself, API management cannot be directly applied to these products. There are few MFT products that support API management, but the support is limited to user management, folder or path access, etc., rather than actual APIs.

Because a client using a traditional file transfer protocol cannot request specific information from a large data file, there are many cases where the client ends up receiving large files, sometimes in the size of few GBs. Large file transfer can be a big challenge for any file transfer protocol. If the client and server are located at different geographic locations, if there is network latency between the client and server, etc., then the file transfer can require too much time to complete. Transient failures, network issues, other failures and resume operations, etc., can pose further challenges. It thus becomes more difficult to ensure or implement data integrity checks, etc., in the case of large file transfers.

Generally speaking, there is no way to optimize or accelerate the file transfers in traditional file transfer protocols, especially in the case of large files. It might be technically possible to compress the data or transfer the data differently based on type of files (e.g., for an XML file, a video, etc.), but the protocol specifications currently do not allow any such custom optimization.

It will be appreciated that it would be desirable to overcome the above-identified and/or other problems. For example, it will be appreciated that it would be desirable to incorporate features, including data- and business-aware features and support for APIs, of more modern file transfer paradigms and facilitating evolution beyond these technologies. It also will be appreciated that it would be desirable to leverage the ubiquity of and provide continuing support for more traditional file transfer technologies.

One aspect of certain example embodiments relates to overcoming the above-described and/or other issues. For example, one aspect of certain example embodiments relates to incorporating features, including data- and business-aware features and support for APIs, of more modern file transfer paradigms and facilitating evolution beyond these technologies, while also making it possible leverage the ubiquity of and provide continuing support for more traditional file transfer technologies.

Certain example embodiments relate to a data transfer system including at least first and second computing systems. The first computing system includes first processing resources and a first transceiver, with the first processing resources including at least one first processor and a first memory. The second computing system includes second processing resources and a second transceiver, with the second processing resources including at least one second processor and a second memory. The second computing system is configured to: receive, from the first transceiver of the first computing system via the second transceiver and using a standard communication protocol, a file operation command, the file operation command relating to a data transfer and indicating data to be transferred and/or a preference for how to transfer data; determine whether the first and second computing systems have implemented thereon complementary program logic modules that are configured to facilitate the data transfer in accordance with the file operation command; responsive to a determination that the first and second computing systems do not have implemented thereon complementary program logic modules that are configured to facilitate the data transfer in accordance with the file operation command, cause the data transfer to take place using the standard communication protocol using the first and second transceivers; and responsive to a determination that the first and second computing systems have implemented thereon complementary program logic modules that are configured to facilitate the data transfer in accordance with the file operation command, cause the data transfer to take place using (a) a common communication protocol that is implemented by the complementary program logic modules but different from the standard communication protocol, and/or (b) data selected and/or transformed by the second computing system side program logic module and understandable by first computing system side program logic module.

In certain example embodiments, a data transfer method is provided. The method comprises: receiving, at a server from a client computing system and using a standard communication protocol, a file operation command, the file operation command relating to a data transfer and indicating data to be transferred and/or a preference for how to transfer data; determining whether the server and client computing system have implemented thereon complementary plugins that are configured to facilitate the data transfer in accordance with the file operation command; responsive to a determination that the server and client computing system do not have implemented thereon complementary plugins that are configured to facilitate the data transfer in accordance with the file operation command, causing the data transfer to take place between the server and client computing system and using the standard communication protocol; and responsive to a determination that the server and client computing system have implemented thereon complementary plugins that are configured to facilitate the data transfer in accordance with the file operation command, causing the data transfer to take place using (a) a common communication protocol that is implemented by the complementary plugins but different from the standard communication protocol, and/or (b) data selected and/or transformed by the server-side plugin and understandable by the client computing system side plugin.

In certain example embodiments, a data transfer method is provided. The method comprises: transmitting, to a server from a client computing system and using a standard communication protocol, a file operation command, the file operation command relating to a data transfer and indicating data to be transferred and/or a preference for how to transfer data; responsive to a determination that the server and client computing system do not have implemented thereon complementary plugins that are configured to facilitate the data transfer in accordance with the file operation command, enabling the data transfer to take place between the server and client computing system using the standard communication protocol; and responsive to a determination that the server and client computing system have implemented thereon complementary plugins that are configured to facilitate the data transfer in accordance with the file operation command, enabling the data transfer to take place using (a) a common communication protocol that is implemented by the complementary plugins but different from the standard communication protocol, and/or (b) data selected and/or transformed by the server-side plugin and understandable by the client computing system side plugin.

According to certain example embodiments, the first computing system may be a client and the second computing system may be a server. In this regard, certain example embodiments relate to a client computing system for use as the first computing system and/or a server for use as the second computing system, e.g., for use in relation to the techniques of any of the three previous paragraphs and/or as set forth more fully below.

According to certain example embodiments, the file operation command may be recognizable by the standard communication protocol as a custom command in accordance with the standard communication protocol's specification (e.g., where the standard communication protocol is FTP and the custom command is a SITE command); the file operation command may not be recognizable by the standard communication protocol as a custom command in accordance with the standard communication protocol's specification (e.g., where the standard communication protocol is FTP and the command that is standard for the standard communication protocol is a RETR command); the file operation command may be a command that is standard for the standard communication protocol but is augmented with one or more additional non-standard arguments; etc.—e.g., based on the plugin(s) implemented.

According to certain example embodiments, the preference for how to transfer data that is provided with the file operation command may be tantamount to an inquiry whether the second computing system has one or more second computing system side program logic module implemented thereon.

In addition to the features of the previous paragraphs, counterpart methods, non-transitory computer readable storage media tangibly storing instructions for performing such methods, executable computer programs, and the like, are contemplated herein, as well.

These features, aspects, advantages, and example embodiments may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which:

FIG. 7 is an example purchase order XML file used to demonstrate how certain example embodiments can operate;

DETAILED DESCRIPTION

Certain example embodiments relate to plugin-based file transfer systems and/or methods that can be implemented in traditional file transfer systems/software that use traditional protocols like FTP, SFTP, and the like, and can address the above-described issues. In certain example embodiments, the plugin decides and/or evaluates the data to be transferred based on the request from client. The actual data transfer uses an existing protocol such as, for example, FTP, SFTP, or the like. The approach is generic in nature and can be applied to a wide variety of areas, at least in the sense that multiple different kinds of modern technologies can be implemented in connection with the plugin-based approach that uses the more traditional protocol as the backbone. ActiveTransfer, for instance, can be directly used in connection with certain example embodiments.

In the technological approach of certain example embodiments, the file transfer product analyzes the type of file and/or data in a file to identify the best way to transfer the associated data. A codec- or plugin-based approach aids in this analysis. Different transfer protocols thus can be plugged into more traditional file transfer protocols. Instances of the data transfer plugin are provided at both the file transfer server and the client device. However, a traditional file transfer client that is not aware of the presence of the plugin also can work with the proposed new file transfer server of certain example embodiments, therefore making the techniques of certain example embodiments compatible with existing clients and existing architectures.

This approach advantageously can address the disadvantages of traditional file transfer protocols discussed above, while also helping to leverage their advantages of traditional file transfer protocols and more modern transfer techniques and making the system flexible and extensible. As noted above, certain example embodiments are backwards-compatible as well, such that existing file transfer servers and/or clients will still work as before, even if the changes discussed herein are implemented in only some of the file transfer servers and/or clients in a given software solution.

Figure 3:
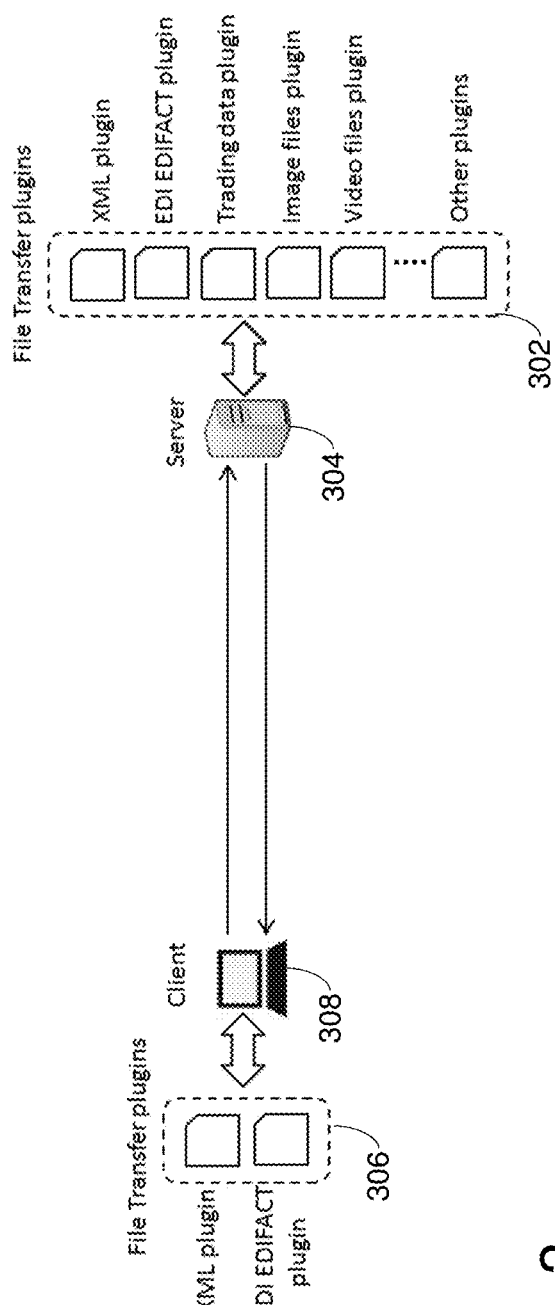
FIG. 3 is a block diagram providing a high-level view of an example architecture underlying certain example embodiments.

FIG. 3 is a block diagram providing a high-level view of an example architecture underlying certain example embodiments. As shown in FIG. 3, a set of server-side plugins 302 is provided to the file transfer server 304. The individual plugins in the server-side set 302 can be used to optimize, or at least provide additional, file operations for specific file types, requests, and/or the like. For example, the set of server-side plugins 302 can be used to provide faster file transfers, perform operations that generally are not possible using traditional file transfer protocols such as, for example, retrieving a section of data from a specific file, etc. The specific server-side plugins shown in FIG. 3 include plugins for handling XML data, EDI EDIFACT data, trading data, image files, video files, and the like. Detailed use cases for these plugins are provided below.

In a similar manner, a set of client-side plugins 306 is provided to the file transfer client 308. These client-side plugins 306 correspond to the plugins available in the server 304. That is, the client-side plugins 306 provide client functionality for the plugins 302, which provide server-side functionality. It will be appreciated that the client 308 in certain example embodiments may have only a subset of plugins that are available in the server 304, as client functionality typically will be limited to only a few specific use cases. For example, the server 304 may server multiple clients that have different functions and, thus, the multiple clients may have multiple different subsets of client-side plugins whereas the server may have a single superset of plugins so that it can respond to the disparate requests from the clients. It also will be appreciated that the client-side and server-side plugins shown in FIG. 3 are provided by way of example and without limitation.

In certain example embodiments, modifications are made to the file transfer logic so that the file transfer and command processing will be routed via the plugins. As explained in greater detail below, the file transfer server 304 is configured to identify the appropriate plugin in its server-side set 302 so that it can process a command, data transfer, etc. Once the plugin is provided with control over command processing, data transfer, etc., it provides the required response, data, etc., to file transfer server 304, which will in turn send it to the client 308. Sample implementations for transfer of control to plugins are discussed in greater detail below.

A client generally will initiate the information exchange in connection with a given file transfer protocol. This initiation can be in the form of an instruction regarding a file upload, download, or other file operation such as, for example, a request to list the files in a specific directory path. In certain example embodiments, when a command for a file operation is initiated by the client, the server analyzes whether there is a plugin that is available for processing the associated request. If a plugin is identified, the server transfers the command processing to the plugin. The plugin responds with either a response to the command, or a data transfer (e.g., a file download).

In most cases, a counterpart plugin will be enabled at the client-side, as well. To help determine whether counterpart plugins exist in the client and the serve, the client connects to server and inquires whether the server supports data transfer plugins generally or a given data transfer plugin in particular. This may be accomplished using a custom command in the server. Most current protocols support custom commands. For example, an FTP server supports the SITE command, which can be used for this purpose. In certain example embodiments, if the server supports data transfer plugins, the client sends a list of data transfer plugins to the server, and the server acknowledge which plugins are supported by the server. In certain example embodiments, the query may be made with respect to a single plugin at the outset.

Further commands, file transfer requests, etc., make use of the data transfer plugins, based on the result of this inquiry phase. A more detailed explanation and example design are provided below.

A data transfer plugin can be added to, or registered with, a file transfer server dynamically. This addition or registration in certain example embodiments may be accomplished by copying some files to a specified folder, making the plugin available in a remote repository and/or enacting configuration changes, which may be dynamically accessed by the file transfer server, e.g., in response to a related request.

In certain example embodiments, the client can be dynamically configured to download a data transfer plugin from the server or other trusted site for example, if so configured. This capability may be particularly useful in B2B scenarios, for example, where new standards and file types oftentimes are added and/or implemented quickly, without much notice, etc. New plugins may be made available and downloaded to clients to help handle the dynamic nature of a variety of applications, including B2B application. The ability to download and implement new plugins also may be useful in cases where existing plugins are modified, e.g., for improved data transfer, to enable new capabilities, etc.

The server includes program logic or algorithms to identify which plugin is to be used when processing a specific file operation command. Several approaches may be used in this regard. For instance, in some cases, the command or files to be operated on will automatically indicate that a plugin needs to be used. For example, if there is an XML data transfer plugin, it may be registered in the server for all *.xml files. Thus, any upload or download request for an XML file would be handled by this plugin. In addition, or in the alternative, the command may have additional details embedded therein or otherwise communicated therewith to help indicate which plugin is to be used. Furthermore, in addition or in the alternative, the client will indicate the plugin to be used. This may be useful, for example, when there are multiple plugins possible for a specific command, when the client needs to ensure that the server will use the exact plugin that the client will be using so that the data is transferred in a compatible manner, etc. One more detailed approach for plugin identification is set forth below.

As noted above, the plugin approach of certain example embodiments helps provide backwards compatibility with existing file transfer servers and clients. As alluded to above, an inquiry as to whether the file transfer server supports data plugins will be made by the client during initial handshake when a connection is created. If the server does not support data transfer plugins, the associated command to use a plugin will be ignored by the server, and the client will not use any additional capabilities offered by the data transfer plugins. The client will use only the standard command processing as per protocol specification. However, if the file transfer server supports data transfer plugins, but if the client does not support them, there will not be any information sent from client during the initial handshake regarding plugins. Hence, the server will be aware that that client is not plugin-compatible and will ensure that the response to any of the commands from client will be as per the standard response in the protocol specification. In either case (the server does not support data transfer plugins, or the client does not support plugins), the server and client can still exchange data.

The example techniques set forth herein can be used in connection with a broad variety of file transfer scenarios and, in many instances, they can help address the disadvantages mentioned above. A first use case and set of advantages relates to the ability to realize optimized and high-speed file transfer. In this regard, certain example embodiments enable the file transfer server to optimize the data transfer between a file transfer server and the client, as the server can now use a plugin that knows how content in a file is structured. That is, the plugin can optimize the file transfer based on the content. For example, a plugin developed for XML files was designed to increase the data transfer speed of XML files. An FTP file transfer using this example plugin was observed to be 8-15 times faster than using a conventional FTP client and server. The performance improvement may in some instances depends upon many other factors such as, for example, bandwidth, etc. In this regard, the performance improvement may be more when the bandwidth between the server and the client is low. In one scenario, the file transfer using a standard FTP client and server was taking more than 3 minutes, where the same file was transferred in less than 13 seconds with the FTP client and server using this plugin. This behavior can be further optimized with better algorithms to handle the data efficiently, and further details concerning this use case are provided below. Similar to the XML plugin mentioned above, plugins can be developed to handle a specific file types, specific document types, etc., e.g., to optimize the data transfer between file transfer server and client.

A second use case and set of advantages relates to partial data transfer and/or data transfer based on request parameters. In this regard, because the plugins of certain example embodiments can understand the data or content inside a file, a file transfer server can perform more operations than just transferring a file as a whole to the client. The client can request a part or segment of data, which the server can transfer to the client. For example, in an XML file, this request for a part of the document can be one node in the whole of the XML data. In a video or movie file, for example, this segment can be one part of the video, or the video at a specific time and/or duration. In several electronic document types, for instance, the segment can be a section of the document. In a medical image, for example an MRI scan image which is around 8 GB, the client can request only specific portions of the image.

The additional parameters or inputs can be added as extra arguments to existing protocol specific standard commands. For example, the RETR command can be used to download a file from an FTP server. The "normal" usage of the command is RETR <remote filename>. The RETR command can be used to download partial data, using the approach of certain example embodiments. This example refers to an FTP server and client that transfers stock trading information. Specifically, using the approach of certain example embodiments, the following command can be used to retrieve the trading transactions for IBM stock from 10:00 AM to 10:10 AM: RETR nyse_daily_10082018.csv IBM 10:00 10:10. This use case can be applied to variety of document and file types. Also, similar to the RETR command, other commands can also be customized to specify additional file operations.

A third use case and set of advantages relates to integration/interoperation with modern technologies. Similar to as mentioned in the immediately preceding use case and set of advantages, file transfer based on command parameters can be used as a strategy to interoperate with modern technologies that are API based. In this regard, file transfer plugins can be created that understand the input parameters, similar to that of an API. The plugin can then process the command and respond to client based on the request parameters.

As a perhaps more concrete example, the REST API might use "GET transaction/10082018" to retrieve the transaction information corresponding to id 10082018. Similarly the FTP command "RETR transaction/10082018" can retrieve the same transaction information as with the API. The FTP server might in reality contain one file for all transaction records, but the plugin may be configured to scan the file to retrieve only this specific record.

The ability to translate between API calls and FTP commands advantageously makes it possible for traditional file transfer protocols to interoperate or integrate with modern API-based technologies, which is a major disadvantages of traditional file transfer protocols. This capability opens a wide variety use cases, e.g., where legacy systems can be integrated with modern API-based technologies.

Figure 1:
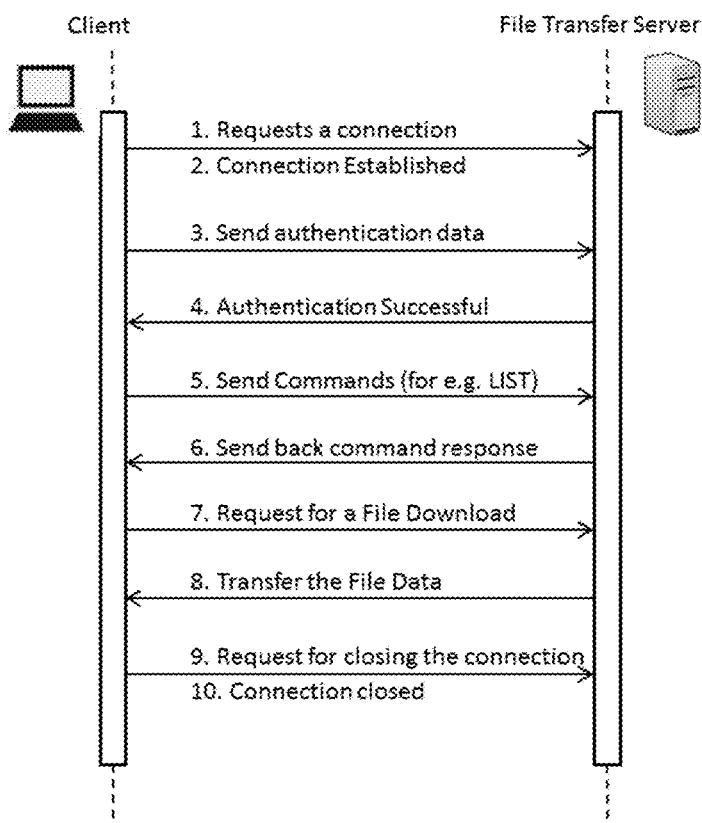
FIG. 1 is an example signal diagram showing a typical data (file) transfer occurring using a traditional file transfer protocol.
Figure 2:
FIG. 2 is an example of a data exchange using a more modern technology such as REST.
Figure 11:
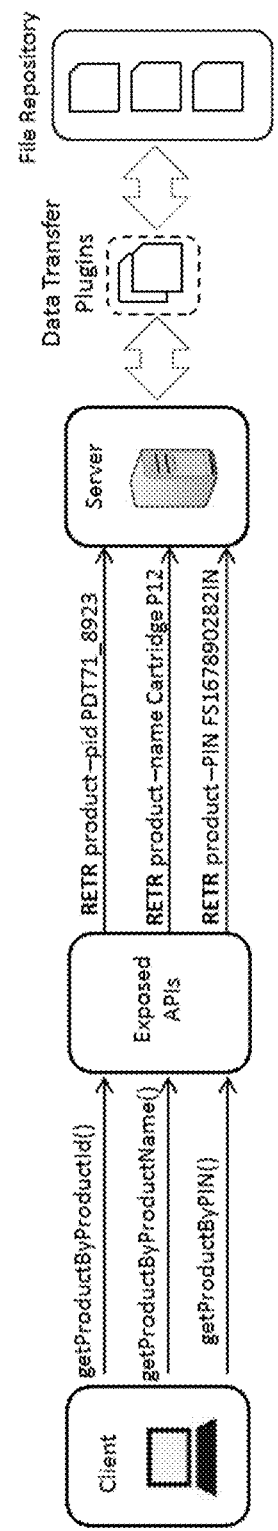
FIG. 11 shows how the techniques disclosed herein can be leveraged to integrate the file transfer with a modern API-based system, in accordance with certain example embodiments.

A fourth use case and set of advantages relates to API management. The approach mentioned above concerning file transfers based on command parameters, as well as the extension relating to integration/interpolation with more modern technologies, makes it possible for API management frameworks to manage and/or monitor file transfer requests made to a traditional file transfer server. The additional command parameters may in some instances be similar to the service parameters in an API-based integration. FIG. 11 discussed below provided one such example, e.g., where product attributes (pid, name, PIN) are used as service attributes in this case. Another example involves using the service name as the file path. For example, the FTP command, RETR/sale/10137 could correspond to the API call mentioned in FIG. 2. In this case, the requested path can be configured in an API management tool to enforce polices like access control, etc. Furthermore, in certain example embodiments, the file transfer plugins can be integrated with an API management framework so that the usage policies can be enforced, and provide other capabilities such as, for example, controlling access, collecting and analyzing usage statistics, reporting on performance, etc.

A fifth use case and set of advantages relates to on-demand data transfer. This use case and set of advantages may be thought of as involving "file transfer without files." That is, the plugin-based approach of certain example embodiments may provide the capability to perform a file transfer, even without an actual physical file being present in a directory. This is similar to the "virtual folder" concept, which is a capability that currently exists.

It will be appreciated that creating and managing physical files is a resource intensive operation and, potentially, problematic from a maintenance perspective. These tasks can require a dedicated hardware for storing files and storage requirements are typically large since one file is required for every upload or download operation. Also, this approach has to handle file data corruption in files, file duplications or file with same name, reliability and failover support when accessing files, etc. The biggest challenge is to handle purging of files. Also business processes need to be tweaked to support file handling.

The plugin based approach proposed in this innovation can work without actual physical files. For example, the request for specific invoice data can be served by a file transfer plugin that actually gets the required data from an order management system and sends the relevant data to the file transfer client, rather than reading it from a file (and/or transferring an entire file from which the specific invoice data is extracted). This approach helps address issues related to physical file management mentioned above, as (potentially) no physical files are involved. This approach also makes traditional file transfer servers more agile so that the plugins can be enhanced to serve potentially any data, without having a new process for creating and maintaining files for each kind of data.

Example Implementation

Details concerning an example implementation are provided below. It will be appreciated that this example implementation is provided to help demonstrate concepts of certain example embodiments, and aspects thereof are non-limiting in nature unless specifically claimed. For example, descriptions concerning example protocols, use cases, classes, functions, schemas, component configurations, etc., are non-limiting in nature unless specifically claimed. In general, the following sections provide example details concerning an initial client-server handshake for agreeing on the plugins to be used, plugin selection logic to be used at runtime for a particular command and how the command processing will be done by the data transfer plugins, etc.

Example Techniques for Data Transfer Plugin Registration Techniques

Data transfer plugin registration may take place at the file transfer server and/or the client in different example embodiments. First, with respect to making the server aware of the data transfer plugins, certain example embodiments enable data transfer plugins to be added to and/or configured for the server, dynamically. One approach for implementing this involves creating the plugins as an extension of a standard interface, for example, a Java interface. The concrete implementation of the interface can be made available in a specific location, for example, a "/resource/plugins" directory in the server. A configuration file in the directory or elsewhere may indicate the logic to identify the plugin to be used, e.g., when a client command is processed. This may be thought of as being a plugin-command mapping (or collection of such mappings). Several example strategies for such mappings are provided in the following table, although other strategies could be used in addition to, or in place of, one or more of those provided in the table.

| Strategy | Example | Description |
| --- | --- | --- |
| Based on the file name processed by the command. Optionally, wildcards, regular expressions, etc., can be implemented. | Filename filter 1: *.dat<br>Filename filter 2: *.xml | The first plugin processes the commands for all files having the "dat" file extension.<br>The second plugin processes the commands for all files having the "xml" file extension. |
| Based on a custom command, which is not part of standard protocol specification. | Custom command: ENCRYPT | The plugin handles all the operations for the new command ENCRYPT, which is not part of standard protocol specification. |
| An additional parameter added to an existing standard protocol command. | RETR command parameter: X12 | All download operations (RETR command) containing an X12 attribute will be processed by this plugin. E.g.: RETR X12 X12-850-1354145302 |

Each plugin may be given a unique plugin name and/or identifier to identify it, and versioning information may be applied thereto as well, e.g., to indicate release levels, etc. There can also be an optional matrix to indicate version compatibility for a plugin between server and client versions in certain example embodiments.

A similar approach used in file transfer server may be used in the client as well, e.g., to register and map the plugins dynamically. Optionally, the clients can be configured to download or upgrade to the latest plugins available via the server or some other location. The downloading/upgrading to the latest versions may be based on some rules set (e.g., set by the user, a system administrator, and/or other party), to help avoid manual update processes. For example, the client and/or server may consult the matrix to ensure that updates are downloaded as soon as they become available, when a prior plugin version is no longer supported, when pushed from an authorized source, etc.

Example Client-Server Handshake Techniques

Figure 4:
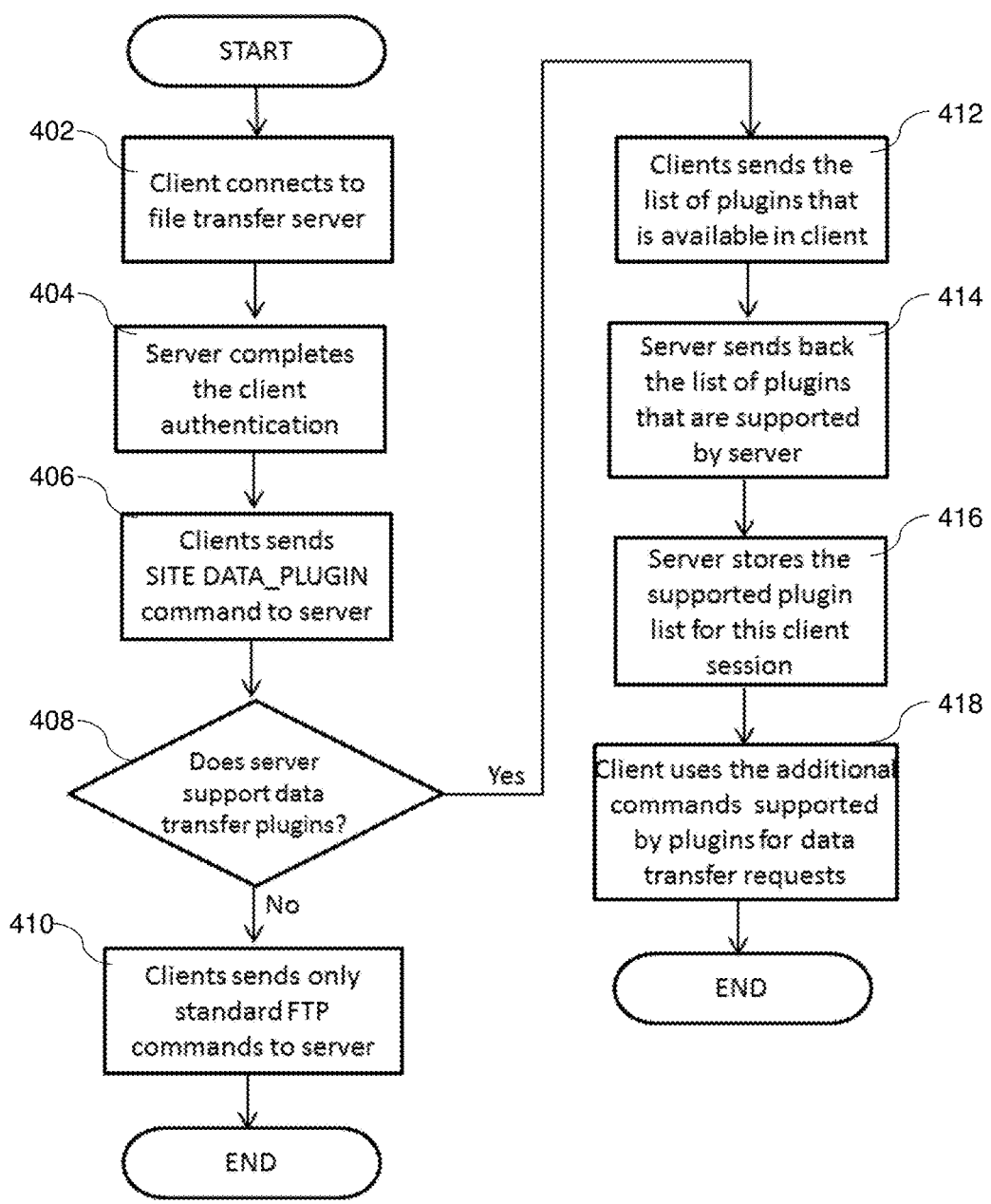
FIG. 4 is a flowchart providing an example approach for agreeing, during a client-server handshake, on the data transfer plugins to be used, in connection with a file transfer server that uses the FTP protocol, in accordance with certain example embodiment.

When a client initiates a connection to file transfer server, the client determines whether the server will support data transfer plugins. FIG. 4 is a flowchart providing an example approach for agreeing, during a client-server handshake, on the data transfer plugins to be used, in connection with a file transfer server that uses the FTP protocol, in accordance with certain example embodiments. Although FTP and the SITE command are mentioned in FIG. 4 and the associated discussion, it will be appreciated that the same or similar sequence may be used in connection with other file transfer protocols and/or commands.

In step 402, the client connects to the file transfer server and performs the necessary handshake to establish an authenticated connection. The authentication is completed in step 404. In step 406, e.g., once the authentication is successful, the client sends a command to the server to verify whether data transfer plugins are supported by server. In this case, a SITE command is used. The SITE command is provided for in the FTP protocol specification as being a sort of reserved custom command. The SITE command is followed by the argument DATA_PLUGIN in this case, which is a request to verify whether the server supports data transfer plugins.

A determination is made in step 408, as to whether the server supports data transfer plugins. If the server does not support data transfer plugins, then the server signals that the command is not recognized by server. Typically this come in the form of a return code of 500 or any other code that is not 200. In this case, the client should consider the FTP server as a traditional FTP server. As indicated in step 410, subsequent commands sent by the client therefore will be standard FTP commands, and the client will not attempt to use any of the data transfer plugin capabilities.

It will be appreciated that if the client determines that the server does not support data transfer plugins in step 408, further file operations commands may be sent as per standard protocol specification. Similarly, if the client does not support data transfer plugins, step 406, etc., will not be executed. Thus, the server will not attempt to do any processing of file operations command, specific to any data transfer plugin. In both the cases, however, the implementation can be seen to be backwards-compatible with existing traditional file transfer servers (and clients) and will not break any already-implemented or running solutions that include file transfer servers or clients.

If the server supports data transfer plugins, the server sends a response back to the client indicating the same. Typically, this will be a response code of 200. Once the client receives a positive response, the client in step 412 sends a list of data transfer plugins that it plans to, or is able to, use in the current FTP session. In this example, the client can use the command SITE LIST_PLUGIN. The server in step 414 responds with a list of data transfer plugins that is supported, e.g., from the original list sent from client. This list may look for a complementary pairing from the client's list and the server's initial master list. The server also stores this list in the client session in step 416, so that this information can be used while identifying the plugins to be used while processing a client request for the current FTP session. An alternative to step 412 that may be implemented involves verifying whether a specific data transfer plugin will be supported by the server, as and when the need arises. Once the above steps are completed, the client can use the additional commands supported by plugins for data transfer requests, as indicated in step 418.

Example Runtime Plugin Identification Techniques

Figure 5:
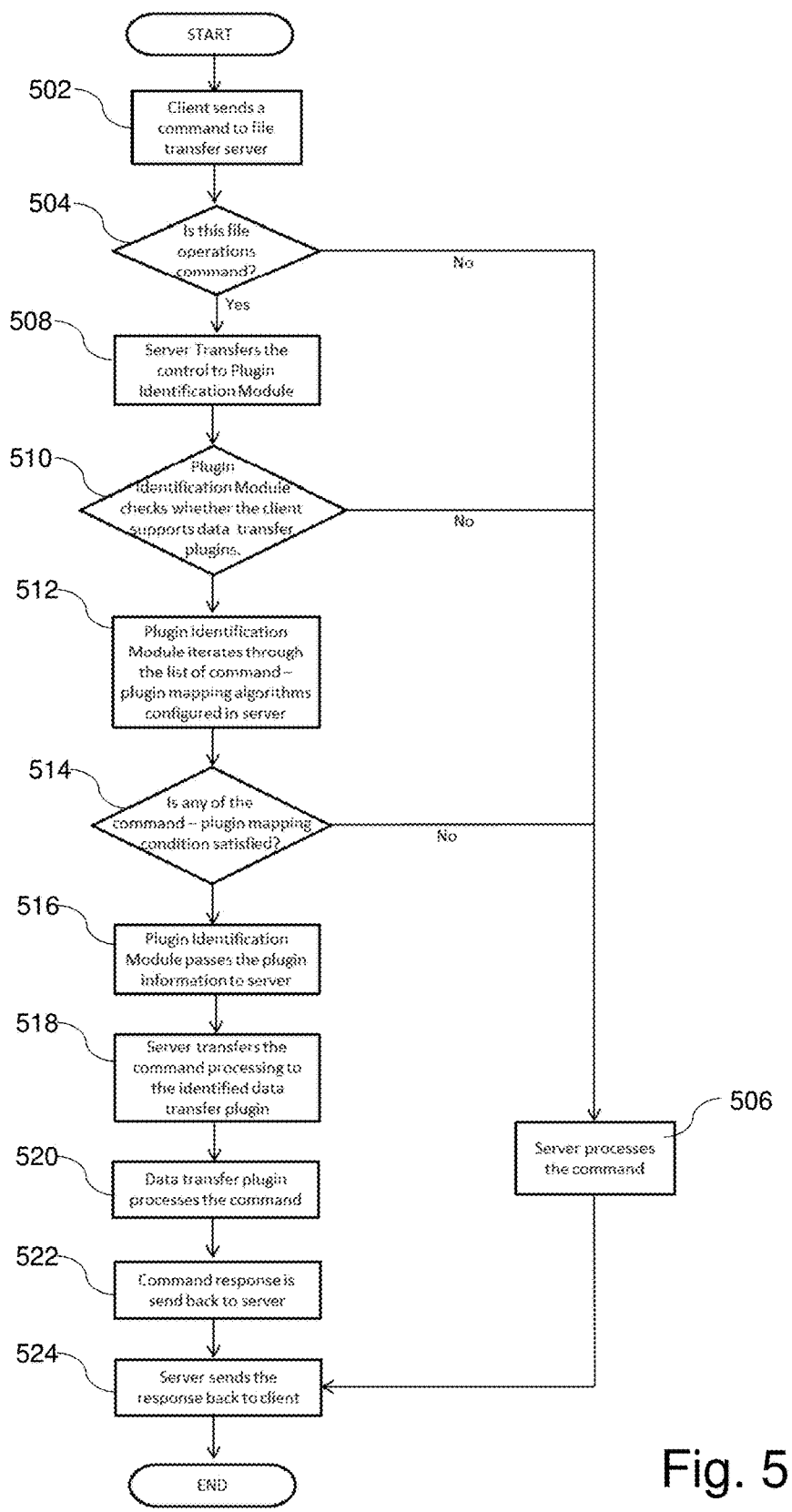
FIG. 5 is a flowchart showing a possible implementation for plugin identification for a client command, in accordance with certain example embodiments.

When the file transfer server receives a command from the client for a file operation, the server has to decide whether the command should be processed directly by the server, or by a data transfer plugin. This determination may be made using a plugin identification module. In this regard, FIG. 5 is a flowchart showing a possible implementation for plugin identification for a client command, in accordance with certain example embodiments.

Consistent with the FIG. 4 example, the client sends a command to the file transfer server. A determination is made in step 504 as to whether the command from the client is a file operation command. There are certain protocol commands that must be processed only by the server (e.g., a command to close the connection). In this case, and for other commands that are not file operation commands, the server processes the command in step 506 as usual. On the other hand, if it is determined that the command from the client is a file operation command, then the server transfer control to the plugin identification module in step 508.

The plugin identification module in step 510 decides whether the current client has indicated that it supports data transfer plugins. If the client supports plugins, the module in step 512 will iterate through plugin command mapping algorithms (e.g., sets of conditions, potentially implemented in program logic on the server) for the data transfer plugins that are agreed to between the server and the current client, e.g., in search of a complementary mapping. The module identifies whether any of the conditions matches the current command from client in step 514. The order of evaluating file type-plugin mapping can be optimized by specifying an order or priority while defining the mapping conditions, in certain example embodiments.

As noted above, different command-plugin mapping algorithms may be provided, as discussed above earlier. As one example, a file transfer plugin may base its decision on whether there is a complementary set of plugins based on file type and root element for different file types, e.g., as set forth in the following table.

| File Type | Root Element | File Transfer Plugin |
|---|---|---|
| *.xml | PurchaseOrder | XML_PuchaseOrder_Plugin |
| *.xml | Invoice | XML_Invoice_Plugin |
| *.csv | | CSV_Plugin |
| *.json | | JSON_Plugin |
| *.zip | | Zip_Plugin |

The sequence for identifying the file transfer plugin in certain example embodiments thus may involve the file transfer server receiving a request for downloading a specific file, and the file transfer server mapping the filename in the request with the filenames available in file type-plugin mapping. In this example approach, the file type may be considered the same as the file name extension. If the file name matches with any of the entries in file type-plugin mapping, the request will be transferred to the corresponding plugin for processing. Further details are provided in the following section. Briefly, it is noted that this is indicated in steps 516 and 518 in FIG. 5, which indicate that the plugin identification module passes the plugin information to the server, and the server transfers the command processing to the identified plugin.

The plugin parses the request and verify whether the specified file type and file operation can be handled by this plugin. If the specified file type and file operation can be handled by the identified plugin, the identified plugin in step 520 will process the request and pass the responsive data back to server in step 522. If the plugin is not able to process the request, the plugin will inform the file transfer server. If the plugin response is not able to process the file, the file transfer server may attempt to find another plugin that is able to handle the command, fall back to normal FTP transfers (e.g., if all plugins have been tested), etc. The server will return the response back to the client in step 524.

It will be appreciated that the above-described approach of identifying the file transfer plugin based on file name extension is just one approach for implementing the file transfer plugin identification. There can be many other approaches for this including, for example, making a determination based on users (as typically one user will deal with one type of file in an enterprise system), based on file paths or folders (as one folder typically contains one type of files), based on size, etc. Combinations of these and/or other criteria also may be implemented in certain example embodiments.

Example Techniques for Command Processing Using Plugins

Figure 6:
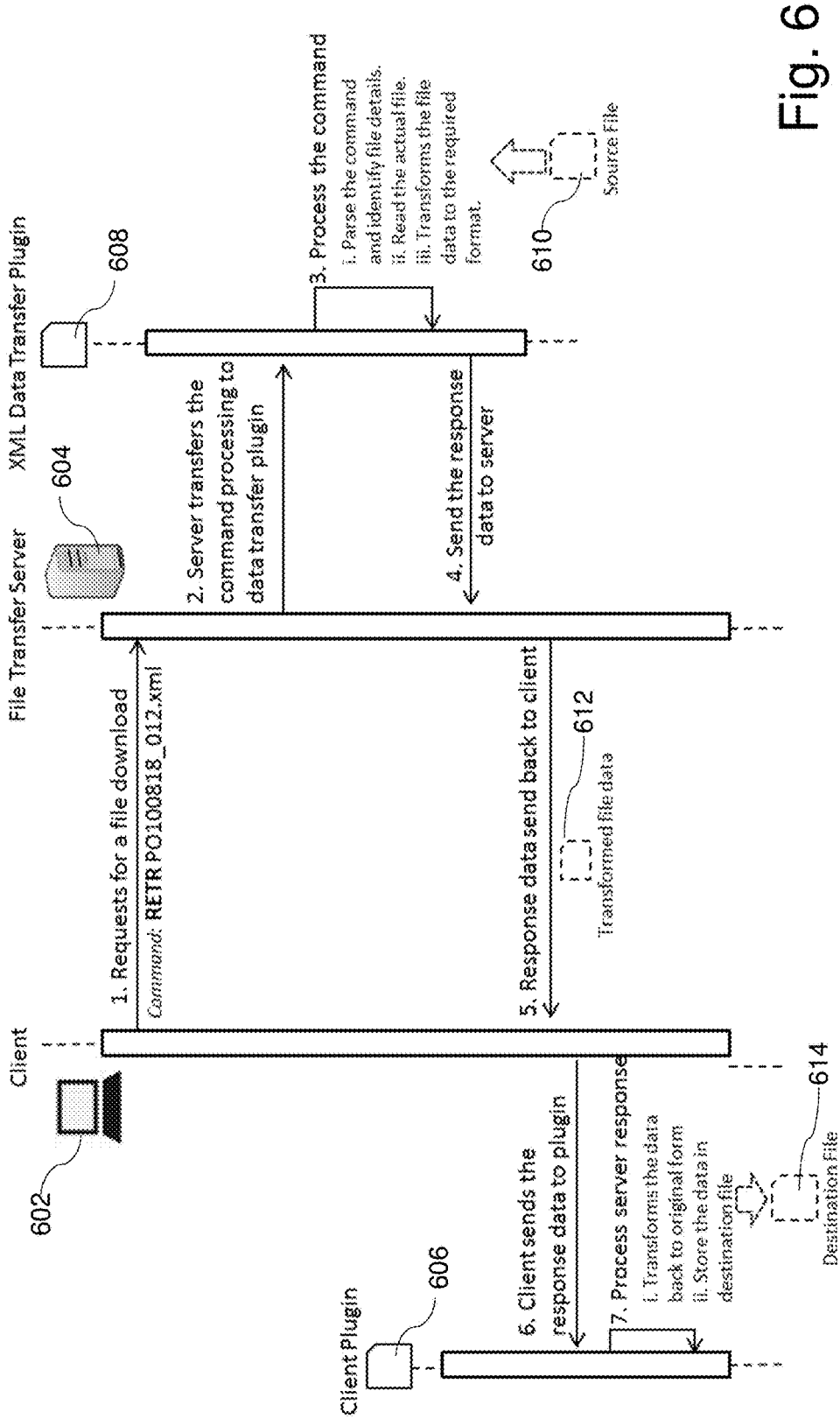
FIG. 6 is a sequence diagram showing how plugins can be used to optimize data exchanges for XML files, in accordance with certain example embodiments.

FIG. 6 is a sequence diagram showing how plugins can be used to optimize data exchanges for XML files, in accordance with certain example embodiments. It will be appreciated that the same or similar sequence can be used for command processing using data transfer plugins designed to handle other file types, other commands, etc. As shown in FIG. 6, the client 602 issues a request to download an XML file. It is assumed that both client 602 and the server 604 have the required plugins installed (or available), and that complementary client-server plugins 606, 608 will be used to process the data for the client 602 and the server 604 for the same type of request. Details concerning how the file transfer server 604 and client 602 agree on the plugins 606, 608 to be used are provided above.

The server 604 receives the request (command) from the client 602. The server 604 is configured to use the server-side XML data transfer plugin 608 for file transfer requests for all XML files (filenames that matches the format "*.xml"). The server 604 identifies the data transfer plugin to process the command using the approach mentioned above. In this case, the command-plugin mapping is based on the filename, and the file download and upload requests are configured to use server-side XML data transfer plugin 608 as mentioned.

The server 604 transfers the request to the specific data transfer plugin 608 for processing. The server-side XML data transfer plugin 608 parses the command, identifies the data to be downloaded, reads the source data file(s) 610, and converts the file and/or information therefrom to an optimized format for data transfer. The processing steps for these actions may include parsing of the command send from the client 602, which in this case is "RETR P0100818_012.xml". This command indicates that the client 602 requests a download of a file whose filename is "PO100818_012.xml".

The server-side plugin 608 identifies the location and other details of file to be downloaded. This may be configured for each user in all file transfer products, using the existing standard configuration approaches. For example, the directory to be searched, etc., can be preconfigured. In a typical file transfer server, it is possible to configure the directories that can be accessed by users such that each user will be given access to only the directories that are relevant to the user. The users (clients) typically will specify the directory from which the file can be downloaded. However, the directories configured normally follow the business conventions: for example docs/outbound/purchaseorders. Similar functionality may be provided in certain example embodiments. The server-side plugin 608 reads the file data, from the file location and transforms the data to the format it requires. The creation of the transformed file data 612 may involve a number of operations. For example, it may involve extracting some content from the original, source file 610, performing some other data conversions in accordance with core functionality of the server-side plugin 608 (e.g., translating FTP commands to API calls and API response information into a file, return command, etc.), and so on. In general, there are a number of different possible transformations that can be performed by plugins of the type disclosed herein including, for example, compressing the data, extracting only one section or selected sections from the entire file, etc.

The server-side plugin 608 transfers the data to the server 604, and the server 604 sends the transformed data 612 back to client 602.

Based on the plugin-command mapping algorithm in the client 602 (similar to server), the response processing is transferred to the data transfer plugin 606 in the client 606. The client-side data transfer plugin 606 converts the now-received transformed data back to the original XML file (or file type) as the expected destination file 614, and the client-side data transfer plugin 606 transfers the expected destination file 614 to the file transfer client 602. The file transfer client 602 saves the XML file to the required location, performs other operations as configured, etc.

Example Use Case: XML Data Transfer Plugin for High Speed Transfers

A server plugin that can optimize an XML file transfer when the file size is large (e.g., more than few 100 MBs) was created to demonstrate the feasibility and advantages of certain example embodiments. Details concerning this example follow.

The inventors of the instant application have observed that in the case of large XML files including B2B data, for example, the size of actual data in the file is substantially less compared to the overall size of the file. This results from the fact that the file includes XML tags and other metadata that is part of the file structure. Sometimes, the size occupied by actual data will be as low as, or lower than, one-third of the size of the original XML file. A plugin that knows how an XML file is structured can extract the data and choose to send only this data to the client. The corresponding plugin in the client then can recreate the XML file based on the known structure and the data payload. This approach can be optimized again by compressing the extracted data in the server, using a good compression technique. If the XML file is for a specific use case or format, the plugin potentially can perform even more optimizations because it knows the data structure in advance.

Consider, for example, the example XML Purchase Order shown in FIG. 7, which was excerpted from Microsoft documentation. The original XML file has 1091 bytes of data. However, the actual data inside the file (e.g., for Name, Quantity, etc.) is only 210 bytes, which is just 20% of the original data. The rest of the data includes XML tag related data, which repeats throughout the file in predictable ways. If the actual data can be extracted and represent it in a way the plugin can interpret, the volume of data to be transferred can be reduced by almost 80%.

An example approach for extracting this data, which enables reconstructing the data back, can be intuited from the table provided below. This example approach uses a unique identifier to represent each XML element tag of the same type, instead of the actual tag.

| ID | Data Value | Corresponding data in original XML | Comments |
|---|---|---|---|
| 1 | 99503:99:10:20 | <PurchaseOrder PurchaseOrderNumber="99503" OrderDate="1999-10-20"> | |
| 2 | | <Address Type="Shipping"> | |
| 3 | Ellen Adams | <Name>Ellen Adams</Name> | |
| 4 | 123 Maple Street | <Street>123 Maple Street</Street> | |
| 5 | Mill Valley | <City>Mill Valley</City> | |
| 6 | CA | <State>CA</State> | |
| 7 | 10999 | <Zip>10999</Zip> | |
| 8 | USA | <Country>USA</Country> </Address> | This data is not required. Can be automatically reconstructed. |
| 9 | | <Address Type="Billing"> | |
| 3 | Tai Yee | <Name>Tai Yee</Name> | |
| 4 | 8 Oak Avenue | <Street>8 Oak Avenue</Street> | |
| 5 | Old Town | <City>Old Town</City> | |
| 6 | PA | <State>PA</State> | |
| 7 | 95819 | <Zip>95819</Zip> | |
| 8 | USA | <Country>USA</Country> </Address> | Not required |
| 10 | Please leave packages in shed by driveway. | <DeliveryNotes>Please leave packages in shed by driveway.</DeliveryNotes> | |
| | | <Items> | Not required. |
| 11 | 872-AA | <Item PartNumber="872-AA"> | |
| 12 | Lawnmower | <ProductName>Lawnmower</ProductName> | |
| 13 | 1 | <Quantity>1</Quantity> | |
| 14 | 148.95 | <USPrice>148.95</USPrice> | |
| 15 | Confirm this is electric | <Comment>Confirm this is electric</Comment> </Item> | Not required. |
| 11 | 926-AA | <Item PartNumber="926-AA"> | |
| 12 | Baby Monitor | <ProductName>Baby Monitor</ProductName> | |
| 13 | 2 | <Quantity>2</Quantity> | |
| 14 | 39.98 | <USPrice>39.98</USPrice> | |
| 16 | 990521 | <ShipDate>1999-05-21</ShipDate> </Item> </Items> </PurchaseOrder> <?xml version="1.0"?> | Not required. Can be automatically reconstructed. |

In the above table, each element in the XML document is converted into a key-value pair. The key is the identifier used to reconstruct the XML element tag in the client and will be unique for each type of XML element (for example, "3" represents PurchaseOrder/Address Type/Name). It can be seen from the table that the actual data to be transferred to the client is very small compared to the file as a whole. In addition to the key-value pair information, metadata may be stored in the same file to be transmitted, with the metadata describing the mapping between the identifiers used and the actual XML element information. In many instances, this will typically occupy a very small amount of space compared to the original data, since the actual data elements will be repeated a few hundred or thousand times.

It will be appreciated that this basic data extraction approach can be used and potentially optimized yet further by using better algorithms. In addition, or in the alternative, an industry-standard compression algorithm, a custom compression algorithm, and/or the like, can be used to further compress the data to be transferred. For example, zip compression can reduce the file size yet further, e.g., by one fifth. Hence, combining both the data extraction and compression approaches, it is possible to reduce the original data by 25 times and/or the data transfer can be 25 times faster.

Figure 8:
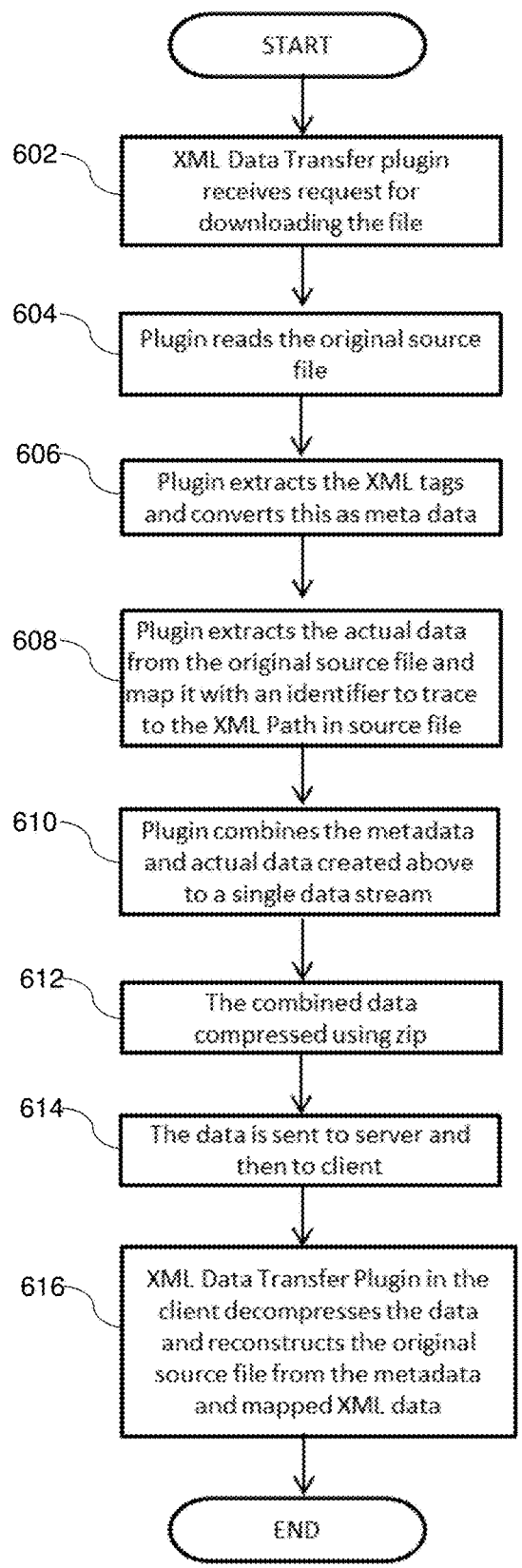
FIG. 8 is a flowchart showing how an example server-side XML data transfer plugin can operate, in accordance with certain example embodiments.

FIG. 8 is a flowchart showing how this example server-side XML data transfer plugin can operate, in accordance with certain example embodiments. When the server receives a request for downloading an XML file in step 602, the server passes the request to the server-side XML data transfer plugin. The server-side XML data transfer plugin 604 reads the original file, and identifies the XML tags (which are repetitive) that hold the actual data. In step 606, these tags are represented as metadata and stored separately by the plugin. The plugin in step 608 extracts the actual data and adds an identifier to the actual data, which is useful in identifying which XML element (tag) which data belongs to. It is noted that the identifier used for this mapping may be small (e.g., 1-2 bytes) and thus will be quite compact compared to the typical long XML tag.

The plugin combines the metadata and the mapped actual data to form a single data stream in step 610. The size of this data will be less than the original source file because long repetitive XML tags will be removed in favor of lightweight identifiers (which might be just one or two bytes in some instances) used in the transformed data to map the data to original XML structure. The plugin compresses the data in step 612 using a standard compression technique like zip. In step 614, the transformed data is sent to server, and the server sends the data to client.

The file transfer client receives the compressed, transformed data and transfers it to the client-side XML data transfer plugin. As indicated in step 616, the client plugin decompresses the data, extracts the metadata and mapped data, and reconstructs the original source file.

In a test environment, it was observed that the size of transformed data was 50-100 times smaller than the actual source file. The file transfer in a normal LAN network took around 75 seconds for an XML file of 400 MB, whereas the same file transfer server took 13 seconds, after introducing the XML data transfer plugins. It will be appreciated that the speed advantage likely increases with lower bandwidth and higher latency, which represents actual customer environments. For example, when the bandwidth was reduced, the file transfer using the plugin still could be completed in 13 seconds, whereas the traditional file transfer using FTP took around 180 seconds. There are many scenarios where this will be useful in low bandwidth settings. For example, webMethods ActiveTransfer is used to transfer files in ships using satellite communication, and the bandwidth available in such cases is very low and the latency is very high.

Example Partial Data Transfer Techniques

One use case where the techniques of certain example embodiments can be applied advantageously relates to scenarios where the client requires only a section of the data in a file to be downloaded. In such cases, the conventional approach is to download the entire file from the server and to extract the actual data required by the client on the client device. This introduces challenges explained above relating to large file transfers. Also, the server generally will not be able to split the original file and make multiple copies available in a destination, since clients can request any data in the original file.

Using certain example embodiments, however, there can be a data transfer plugin in the server that determine the exact data to be transferred, e.g., based on the request from client. Two real-world use cases are provided below.

A first example relates to trading data. In the first example, a client requires transaction data from a stock trading exchange for a specific time period. In the conventional approach, the client will download the data for the required day and extract the information from the required time period from the downloaded file. However, because the downloaded file contains the entire data set, the file size typically will be huge. It would not be uncommon for such data to be a few hundred MBs of size or possibly even GBs. Downloading such large files is quite inefficient and, as mentioned earlier, causes with large file transfer related issues. If the file transfer server has to serve similar requests from each trading client, the processing power required of the server will be very high, and the scalability of the server will be very low.

This can be addressed using certain example embodiments by providing a data transfer plugin in the server, referred to as a server-side trading data transfer plugin. This server-side trading data transfer plugin analyzes the request from the client and returns only the required information. The information sent to client is only a subset of the actual data in the original file.

Figure 9:
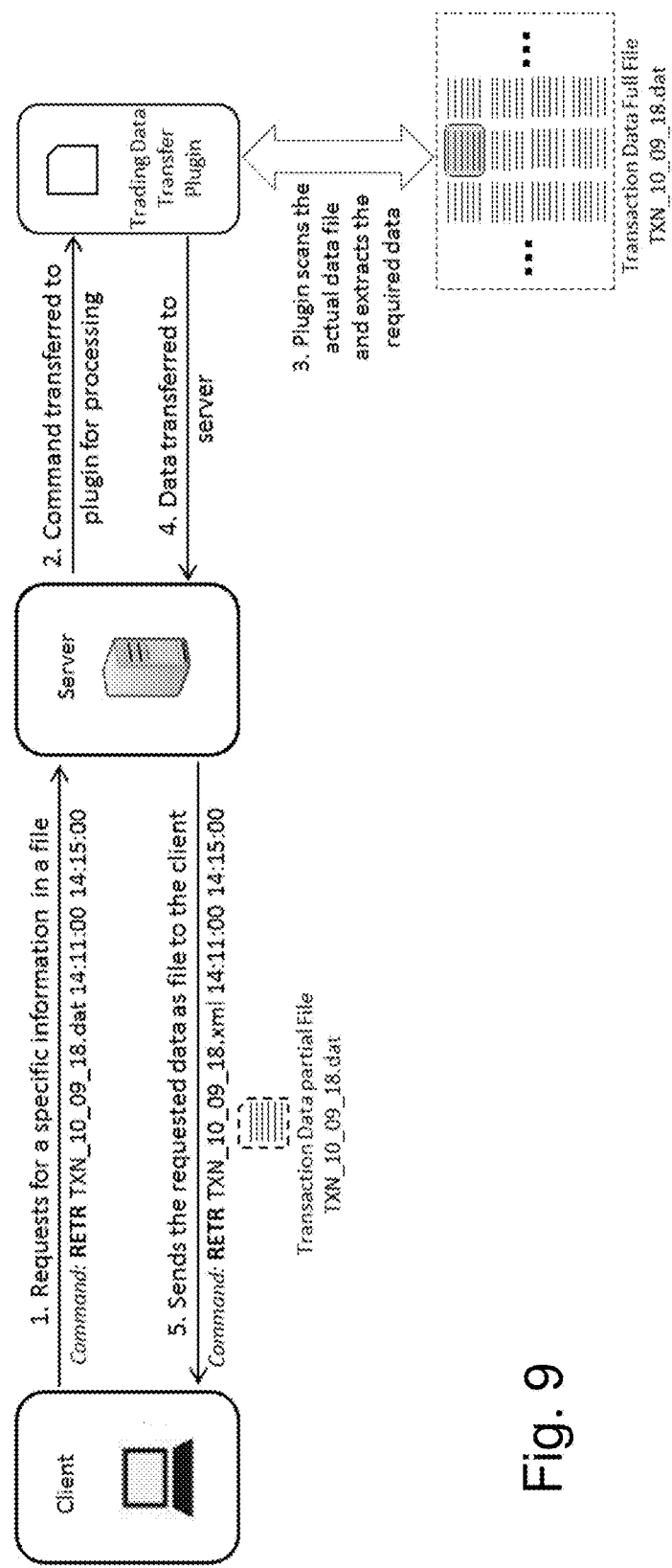
FIG. 9 schematically shows how complementary trading data transfer plugins can operate, in accordance with certain example embodiments.

FIG. 9 schematically shows how complementary trading data transfer plugins can operate, in accordance with certain example embodiments. As shown in FIG. 9, the client requests the transaction data file for stock trading for a specific date, but indicates that only the data from the time period 14:11:00 to 14:15:00 is required. This information is passed as augmented attributes in the RETR FTP command. It will be appreciated that other arguments may be passed such as, for example, a particular stock ticker symbol, a date range, a request for volume data, etc. The server transfers the received augmented RETR command to the server-side trading data transfer plugin for processing. The server-side trading data transfer plugin parses the command, identifies the file to be read, and extracts only the data that is required by the client. The extracted data file is sent to the server and, ultimately, back to the client from the server.

This approach advantageously enables huge savings in terms of server and client processing power, resource usage, network bandwidth, etc., and improves the transaction processing capabilities of the server accordingly. This approach may be useful in many scenarios where the target file is large including, for example, when a specific element in an XML file is sought, when a specific set of records in an EDI file is requested, when a specific range of data from any type of data file is requested, when a specific time period of a recording in a video file or image (e.g., medical image) is desired, etc.

A second example relates to partial XML data transfer based on XPath. In this second use case, a server-side XML data transfer plugin is used to manipulate the client request for file downloads. In certain example embodiments, clients can request a section or specific elements inside an XML file, e.g., using XPath expressions or the like, so that the whole data file need not be downloaded.

An example implementation for Process Warranty Claim XML data as per Standards for Technology in Automotive Retail (STAR) specification will now be provided. STAR defines the open, standard XML message formats for dealer-to-OEM communications or other partners related to automotive industry for variety of use cases like Parts Orders, Sales Leads, and Credit Applications, etc. There is an XSD schema, as well as a sample data XML file published for Process Warranty Claims, for which the structure can be represented symbolically as follows. The following is only a part of the whole XML structure, and the complete format is available in STAR specification website:

```
<ProcessWarrantyClaim>
    <ProcessWarrantyClaimDataArea>
        <WarrantyClaimNoun>
```

```
            <WarrantyClaimHeader>
                <DocumentDateTime>
                <SecondaryPassword>
                <SecondaryDealerNumberID>
                <DocumentIdentificationGroup>
                <SecondaryReferenceNumberString>
                <DealerParty>
                <OwnerParty>
                <Co-OwnerParty>
                <PrimaryDriver>
                <SecondaryPrimaryDriver>
                <RepairOrderVehicleLineItem>
                <Warranty>
                <ServiceContract>
                <CASE>
                <RepairOrderOpenedDate>
                <RepairOrderCompletedDate>
                <RepairOrderInvoiceDate>
                <ServiceAdvisorParty>
                <InDistanceMeasure>
                <OutDistanceMeasure>
                <OrderNotes>
                <OrderInternalNotes>
                <DepartmentType>
                <RentLoaner>
                <ServiceComponents>
                <Sublet>
                <LaborRateAmount>
                <Price>
                <Tax>
                <DataCollectionStatus>
                <ESCFranchiseIndicator>
                <Splits>
                <TreadActIndicator>
                <LocationID>
                <RepairOrderStatus>
                <ReturnDisallowedPartsIndicator>
            <WarrantyClaimHeader>
        <WarrantyClaimNoun>
    <ProcessWarrantyClaimDataArea>
<ProcessWarrantyClaim
```

The XML data file for this is likely to be huge, as this contains a lot of information related to warranty processing such as, for example, vehicle details, transportation, parts, tax, etc. However, each department that processes the request is likely to need just the information required for its own purpose. If the XML data file is stored in a central file server, for example, every department or client will have to download the entire file and then parse the file to fetch the information required for that department if the traditional approach is implemented.

By contrast, the plugin-based file transfer approach of certain example embodiments can enable each department or client that processes the Warranty Claim to simply download only the information required for its own purposes. The data that is required for a client can be specified as an XPath query or the like. For example, the data file contains warranty information of the vehicle in the following element:
/ProcessWarrantyClaim/ProcessWarrantyClaimDataArea/WarrantyClaimNoun/WarrantyClaimHeader/Warranty The section that validates the warranty information of the claim merely needs this information. Other data like transportation, logistics, address, etc., is not required for this client. Assuming that the claim process details are stored in a file <claim id>.xml, the FTP command to get the warranty information could be implemented as:
GET 107812_25102018.xml /ProcessWarrantyClaim/ProcessWarrantyClaimDataArea/WarrantyClaimNoun/WarrantyClaimHeader/Warranty
where 107812_25102018 is the claim id.

The XML data transfer plugin used in this case will fetch the file 107812_25102018.xml, parse the data, and identify the required element to be sent back to client. The processing will be the same as with the trading data transfer plugin mentioned above. Similar benefits can be seen here, as well.

Example Techniques for Integration with API-Based Technologies

One major drawback of traditional file transfer protocols relates to its general inability to interoperate or integrate with modern API-based technologies. API-based technologies are "aware" of business data. The information exchange in such a scenario oftentimes will be for specific business data, for example, to get the details of an invoice in a B2B integration, to get the information about a product, to know about the transaction details in a financial system, etc. API-based approaches in general are agile and can be easily extended: Once there is a new requirement for some kind of information, a new API can be exposed that will provide the required information. For the same reason, API-based approaches can integrate with each other easily. For example, an order management system can easily call an API in a partner management system to get the partner details required for an order.

Yet traditional file-based integrations are more rigid. It is not that easy to create new files based on each new requirement from clients, customers, or partners, since creating and managing files has its own challenges. Traditional file transfer systems typically offer a set of predefined files, and the clients or consumers have to build the business logic based on the availability of the files.

Certain example embodiments can help address this deficiency by having data transfer plugins that can provide the information required by a new customer or partner requirement. The underlying data files can still be same, but the plugin in this example can analyze the data files and extract the required information to be sent to client. Because the data transfer plugins can be dynamically added, it is easy to incorporate a new data requirement from client. This capability, combined with the on-demand file transfer feature mentioned below, can make traditional file transfer systems as powerful as modern API-based systems in some instances.

Figure 10:
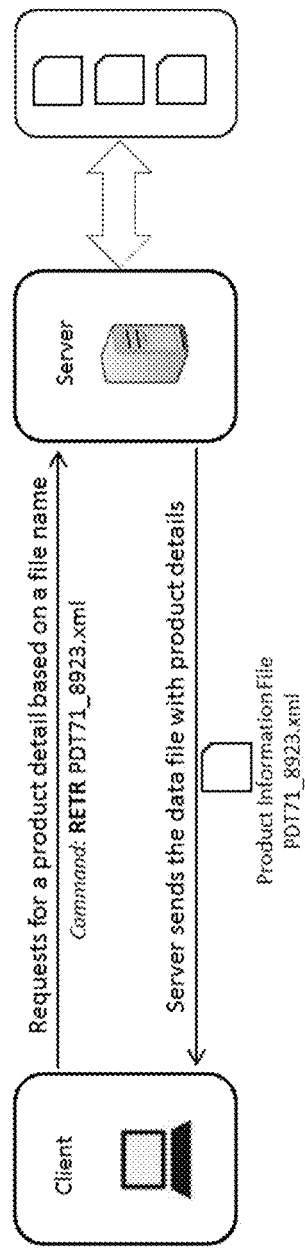
FIG. 10 shows the traditional file transfer approach for obtaining product details.

The following example involves a B2B system that provides details of a product (or catalog). FIG. 10 shows the traditional file transfer approach for obtaining product details; and FIG. 11 shows how the techniques disclosed herein can be leveraged to integrate the file transfer with a modern API-based system, in accordance with certain example embodiments.

FIG. 10 involves a traditional file transfer system, where the product or catalog information is stored in a file with the name of product and unique identifier. The systems will have to use the identifier as the filename to download this file. It is difficult to change the system to obtain the product information using a different parameter such as, for example, the product name, because the system will have to generate those many duplicate data files with the required new parameter.

FIG. 11, by contrast, shows how certain example embodiments can help implement an API-based integration for the same use case. In this example implementation, the data transfer plugins enable the file transfer server to accept the file download request based on multiple input parameters such as, for example, unique product identifier, product name, registered product identifier (PIN), etc. A server-side data transfer plugin can search the same set of files that is available in the repository, and retrieve the data as per the input parameter specified by the client. FIG. 11 also shows an API in front of the system that converts the file based data exchange to an API based data exchange for external clients. Thus, API calls can be made to exposed APIs, and exposed APIs can issue FTP commands to the server for interpretation and processing by the server-side plugin in certain example embodiments.

Example On-Demand File Transfer Techniques

Traditional file transfer protocols require physical files to send data between a server and client, and vice versa. But as discussed earlier, creating and managing physical files can require additional solutions, can be resource intensive, and be troublesome from a maintenance perspective. Dedicated hardware may be needed for storing files, and storage requirements typically are large, since one file is required for every upload or download operation. Also, conventional approaches have to handle file data corruption in files, file duplication/files with same name, reliability and failover support when accessing files, etc. Another big challenge relates to the purging of files: When a file is no longer used, it oftentimes would be prudent to remove the files from the directory or storage location. Business processes also oftentimes need to be tweaked to support file handling.

The plugin-based approach of certain example embodiments advantageously can work without actual physical files in certain example embodiments. For example, the request for a specific invoice file can be served by a file transfer plugin that actually retrieves the required data from the order management system directly (e.g., via an API call or the like) and sends this information to the file transfer client, rather than reading the data from a file and/or sending an entire collection of records in from a larger aggregated file. This approach advantageously addresses the issues and challenges related to physical file management mentioned above, as it is possible to implement solutions in some instances where no physical files are involved.

Figure 12:
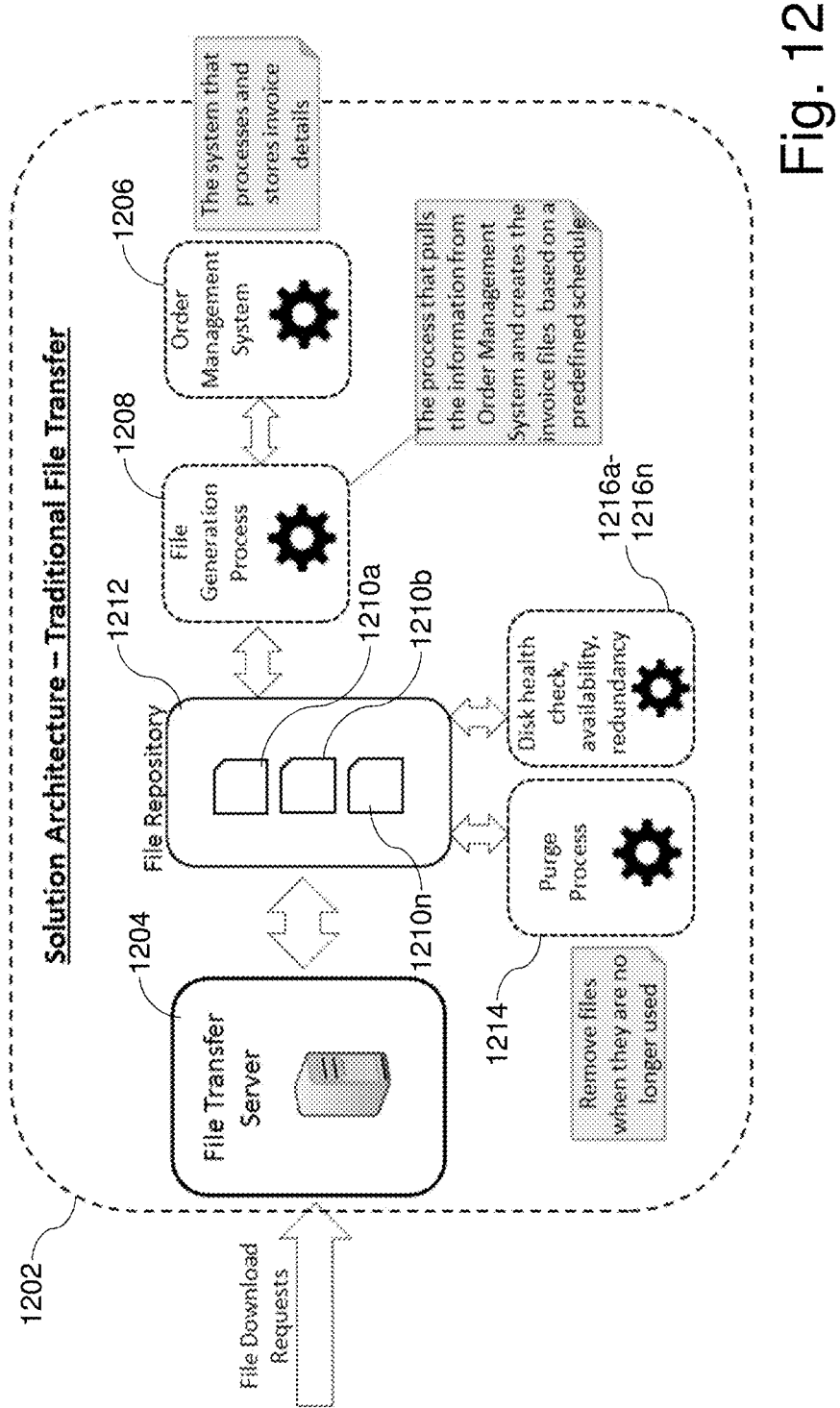
FIG. 12 shows a traditional file transfer solution architecture that may be used to enable clients to download invoices from a server.

FIG. 12 shows a traditional file transfer solution architecture 1202 that may be used to enable clients to download invoices from a server 1204. The invoice processing in this solution is performed in an order management system 1206, and this order management system 1206 is the system that includes the invoice details. There is an invoice file generation process 1208 that polls the order management system 1206 as per a predefined schedule (which may be every few seconds in some instances), retrieves the invoice details based on some criteria, and creates physical files 1210a-1210n in a repository 1212 (e.g., a file system directory) that can be later picked up by the file transfer server 1204.

When a file transfer request is received from a client, the server 1204 will retrieve the appropriate file from this repository 1212 and send the file to the client. A purge process 1214 runs to purge (remove) the files when they are no longer required. The purge process may operate based on some logic, for example, files that were created before a specific time period should be removed, files not accessed within a certain amount of time should be removed, etc. Other processes 1216a-1216n may run as part of the solution, others as part of the infrastructure, etc. These other processes 1216a-1216n may help to ensure that the file storage access provides the required availability and reliability, redundancy to handle disk failures, monitoring to make sure that storage space is not exhausted, etc.

Thus, it will be appreciated that the implementation described in connection with FIG. 12 that uses traditional file transfer techniques involves a lot of components, operations, program logic, etc. This makes the approach not agile. For instance, making a new file available to client typically will require all the dependent process to be implemented for the new file. Furthermore, a large amount of static information is created, even though it might not be used.

In contrast, the plugin-based approach of certain example embodiments can reduce, and sometimes even eliminate, the need for many of the components shown in and described in connection with FIG. 12 including even the files. This may be accomplished in certain example embodiments by directly pulling the required information from the backend system.

Figure 13:
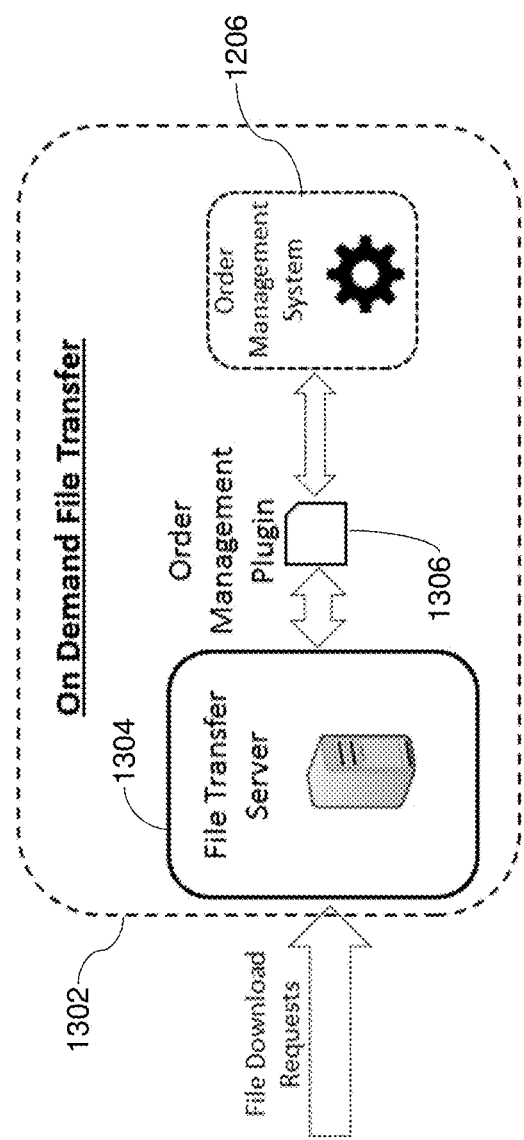
FIG. 13 is an improved file transfer solution architecture 1302 that may be used to enable clients to download invoices from the server 1304, in accordance with certain example embodiments.

In this regard, FIG. 13 is an improved file transfer solution architecture 1302 that may be used to enable clients to download invoices from the server 1304, in accordance with certain example embodiments. In this implementation, the file transfer server 1304 has a data transfer plugin 1306 named order management plugin. When the file transfer server 1304 receives a request for file transfer, the request is processed by the server-side order management plugin 1306. This plugin 1306 directly connects to the order management system 1206 (which may be unchanged from the FIG. 12 example implementation in some instances), queries it to obtain the invoice details, creates a file in the required format, and sends it to the client. It can be seen that this architecture 1302 is much simpler than the solution using traditional file transfer using physical files. This approach also advantageously handles the challenges that were caused by or at least related to the presence of physical files. For example, because files are generated dynamically, they do not need to be purged with a special process and, instead, they simply can be discarded after creation. As another example, because there are no physical files generated, there is no need of a special process to purge files. Storage space, bandwidth, and other concerns are less problematic given the more dynamic behavior of the FIG. 13 approach. The approach of FIG. 13 also is similar to the "virtual folder" concept, which currently is supported by few file transfer servers. The overall approach of certain example embodiments makes traditional file transfer servers agile so that the plugins can be enhanced to serve any data, without having a new process for creating and maintaining files for each kind of data in certain example embodiments.

It will be appreciated that the plugins may be small executable packages or program logic modules in certain example embodiments. These executable packages or program logic modules may be implemented in software executable by, and/or at the direction of, the server's processing resources. They may be local to or remote from the server in certain example embodiments.

Certain example embodiments have been described in connection with file transfer related requests and file transfer servers. It will be appreciated that the example techniques disclosed herein have broader applicability. For instance, the example techniques set forth herein may be used in connection with any application that involves, for example, handling large chunks of data uploaded to/downloaded from a server or other device. Such applications may include virus scanning, searching, map-reduce functionality, asymmetric gaming, media services, and/or other applications. Moreover, although client-server architectures are implicated in certain example embodiments, the technology disclosed herein is not so limited. That is, the technology disclosed herein may be used in connection with peer-to-peer and/or other network types and topologies in different example embodiments.

It will be appreciated that as used herein, the terms system, subsystem, service, engine, module, programmed logic circuitry, and the like may be implemented as any suitable combination of software, hardware, firmware, and/or the like. It also will be appreciated that the storage locations, stores, and repositories discussed herein may be any suitable combination of disk drive devices, memory locations, solid state drives, CD-ROMs, DVDs, tape backups, storage area network (SAN) systems, and/or any other appropriate tangible non-transitory computer readable storage medium. Cloud and/or distributed storage (e.g., using file sharing means), for instance, also may be used in certain example embodiments. It also will be appreciated that the techniques described herein may be accomplished by having at least one processor execute instructions that may be tangibly stored on a non-transitory computer readable storage medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A data transfer system comprising:
 a first computing system that includes first processing resources and a first transceiver, the first processing resources including at least one first processor and a first memory; and
 a second computing system that includes second processing resources and a second transceiver, the second processing resources including at least one second processor and a second memory, wherein the second memory is configured to store a plurality of plugins that are configured to be separately implemented by a data transfer process that is executable on the second computing system, each of the plurality of plugins configured to process at least one of plural different file types,
 wherein the second computing system is configured to:
  receive, from the first transceiver of the first computing system via the second transceiver and using a standard communication protocol, a file operation command, the file operation command relating to a data transfer for a file and indicating data to be transferred and/or a preference for how to transfer data;
  determine a file type for the file relating to the file operation command;
  determine whether the first and second computing systems have implemented thereon complementary plugins that are configured to facilitate the data transfer based on the determined file type;
  responsive to a determination that the first and second computing systems do not have implemented thereon complementary plugins that are configured to facilitate the data transfer in accordance with the file operation command, cause the data transfer to take place using the standard communication protocol using the first and second transceivers; and
  responsive to a determination that the first and second computing systems have implemented thereon complementary plugins;
   a) dynamically select a first plugin of the plurality of plugins based on the determined file type,
   b) process the file using the first plugin to extract a subset of data from the file, and
   c) cause data, which is at least based on the extracted subset of data from the file, to be transmitted to the first transceiver of the first computing system, wherein the first computing system is configured to use a complementary plugin on the received data to thereby recreate the file.

2. The data transfer system of claim 1, wherein the first computing system is a client and the second computing system is a server.

3. The data transfer system of claim 1, wherein the file operation command is recognizable by the standard communication protocol as a custom command in accordance with the standard communication protocol's specification.

4. The data transfer system of claim 3, wherein the standard communication protocol is FTP and the custom command is a SITE command.

5. The data transfer system of claim 1, wherein the file operation command is not recognizable by the standard communication protocol as a custom command in accordance with the standard communication protocol's specification.

6. The data transfer system of claim 1, wherein the file operation command is a command that is standard for the standard communication protocol but is augmented with one or more additional non-standard arguments.

7. The data transfer system of claim 6, wherein the standard communication protocol is FTP and the command that is standard for the standard communication protocol is a RETR command.

8. The data transfer system of claim 1, wherein the file operation command embeds an inquiry as to whether the second computing system is capable of handling data transfers other than via the standard communication protocol;
 wherein the determination as to whether the first and second computing systems have implemented thereon complementary plugins that are configured to facilitate the data transfer in accordance with the file operation command is performed, conditioned on the second computing system being able to process the file operation command in a manner that indicates that the second computing system is capable of handling data transfers other than via the standard communication protocol; and
 wherein the second computing system is further configured to cause the data transfer to take place using the standard communication protocol using the first and second transceivers in response to the second computing system being unable to process the file operation command in a manner that indicates that the second computing system is capable of handling data transfers other than via the standard communication protocol.

9. The data transfer system of claim 1, wherein the first computing system includes a plurality of first computing system side plugins for handling data requests in different respective manners and/or the second computing system includes a plurality of second computing system side plugins for handling data requests in different respective manners.

10. The data transfer system of claim 1, wherein the second computing system is further configured to:
 request from the first computing system a list of each first computing system side plugins implemented on the first computing system; and
 responsive to receipt of the list from the first computing system, perform the determination as to whether the first and second computing systems have implemented thereon complementary plugins that are configured to facilitate the data transfer in accordance with the file operation command is performed in connection with the received list.

11. The data transfer system of claim 10, wherein the second computing system is further configured to attempt to retrieve and install a further second computing system side plugin in attempting to find a complement to a given first computing system side plugin.

12. The data transfer system of claim 1, wherein the preference for how to transfer data that is provided with the file operation command is tantamount to an inquiry whether the second computing system has one or more second computing system side plugin implemented thereon.

13. The data transfer system of claim 1, wherein the determination as to whether the first and second computing systems have implemented thereon complementary plugins that are configured to facilitate the data transfer in accordance with the file operation command includes identifying a second computing system side plugin that is appropriate for the indication of data to be transferred and/or preference for how to transfer data for transferring data that is provided with the file operation command.

14. The data transfer system of claim 13, wherein the identifying takes into account file type information included with the file operation command.

15. The data transfer system of claim 1, wherein the data transfer is caused to take place using data accessible to the second computing system that is transformed from an original format into a new format by the second computing system side plugin.

16. The data transfer system of claim 15, wherein the first computing system side plugin is configured to transform data in the new format into data in the original format.

17. The data transfer system of claim 1, wherein the data transfer is caused to take place using data selected from a file accessible to the second computing system by the second computing system side plugin without also transferring the file itself.

18. The data transfer system of claim 1, wherein the data selection and/or transformation is performed based on file type information included in the file operation command.

19. The data transfer system of claim 1, wherein the data selection and/or transformation is performed based on one or more arguments included in the file operation command.

20. The data transfer system of claim 1, wherein a given first computing system side plugin is configured to convert API calls into FTP commands suitable for transmission to the second computing system.

21. The data transfer system of claim 1, wherein a given second computing system side plugin is configured to convert received FTP commands into API calls and issue such API calls.

22. A client computing system for use as the first computing system of claim 1.

23. A server for use as the second computing system of claim 1.

24. The data transfer system of claim 1, wherein the second computing system is further configured to, as part of processing the file to extract a subset of data from the file:
separate data of the first file into at least instances of first data and instances of second data;
generate a plurality of key-value pairs, where each instance of first data has a corresponding key-value pair, with the key being an identifier and the value being a corresponding instance of the first data, wherein each unique identifier in the plurality of key-value pairs identifies a different type of second data;
create a metadata map that maps each unique identifier into a different type of second data, wherein the first file contains a plurality of instances for the same second data types; and
combine the generated plurality of key-value pairs and the created metadata map into a data stream that is transmitted to the first transceiver of the first computing system, wherein the first computing system is configured to use a complementary plugin to recreate the file based on both the plurality of key-value pairs and the metadata map.

25. The data transfer system of claim 24, wherein the file type is eXtensible Markup Language (XML) file and the first data includes content of XML tags and second data includes XML tag and/or XML path data.

26. The data transfer system of claim 1, wherein the second computing system is further configured to compress the extracted subset of data before transmission to the first computing system.

27. A data transfer method, comprising:
receiving, at a server from a client computing system and using a standard communication protocol, a file operation command, the file operation command relating to a data transfer for a file and indicating data to be transferred and/or a preference for how to transfer data;
determining a file type for the file relating to the file operation command;
determining whether the server and client computing system have implemented thereon complementary plugins that are configured to facilitate the data transfer in accordance with the determined file type;
responsive to a determination that the server and client computing system do not have implemented thereon complementary plugins that are configured to facilitate the data transfer in accordance with the file operation command, causing the data transfer to take place between the server and client computing system and using the standard communication protocol; and
responsive to a determination that the server and client computing system have implemented thereon complementary plugins:
a) dynamically selecting a first plugin of the plurality of plugins based on the determined file type,
b) processing the file using the first plugin to extract a subset of data from the file, and
c) causing data, which is at least based on the extracted subset of data from the file, to be transmitted to the client computing system, wherein the client computing system is configured to use a complementary plugin on the data that is transmitted thereto to thereby recreate the file.

28. A non-transitory computer readable storage medium tangibly storing instructions that, when executed by a server including a processor and a memory, causes the server to perform the method of claim 27.

29. A data transfer method, comprising:
transmitting, to a server from a client computing system and using a standard communication protocol, a file operation command, the file operation command relating to a data transfer for a file and indicating data to be transferred and/or a preference for how to transfer data;
determining a file type for the file relating to the file operation command;
responsive to a determination that the server and client computing system do not have implemented thereon complementary plugins that are configured to facilitate the data transfer in accordance with the determined file type, enabling the data transfer to take place between the server and client computing system using the standard communication protocol; and responsive to a determination that the server and client computing system have implemented thereon complementary plugins:
- a) dynamically selecting a first plugin of the plurality of plugins based on the determined file type,
- b) receiving, from the server, a subset of data that is transmitted from the server in response to the file operation command, wherein less than all of the file is transmitted, and
- c) reconstructing the file from the subset of data that is received by using a complementary plugin on the received subset of data to thereby reconstruct the file, wherein the complementary plugin at least reconstructs the by recreating the structural elements of the file that were not included in the received subset of data.

30. A non-transitory computer readable storage medium tangibly storing instructions that, when executed by a client computing system including a processor and a memory, causes the client computing system to perform the method of claim 29.

* * * * *